United States Patent
Sarkar et al.

(10) Patent No.: US 8,055,855 B2
(45) Date of Patent: Nov. 8, 2011

(54) VARYING ACCESS PARAMETERS FOR PROCESSES TO ACCESS MEMORY ADDRESSES IN RESPONSE TO DETECTING A CONDITION RELATED TO A PATTERN OF PROCESSES ACCESS TO MEMORY ADDRESSES

(75) Inventors: Prasenjit Sarkar, San Jose, CA (US); Dinesh Kumar Subhraveti, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 11/868,445

(22) Filed: Oct. 5, 2007

(65) Prior Publication Data
US 2009/0094419 A1    Apr. 9, 2009

(51) Int. Cl.
*G06F 12/00* (2006.01)
(52) U.S. Cl. ......... 711/150; 711/147; 711/151; 711/165
(58) Field of Classification Search .............. 711/161, 711/162
See application file for complete search history.

(56) References Cited

U.S. PATENT DOCUMENTS

| | | | | |
|---|---|---|---|---|
| 5,095,421 A | * | 3/1992 | Freund | ............ 718/101 |
| 5,129,080 A | | 7/1992 | Smith | |
| 5,285,528 A | * | 2/1994 | Hart | ............ 710/200 |
| 5,502,840 A | | 3/1996 | Barton | |
| 5,590,277 A | | 12/1996 | Fuchs et al. | |
| 5,790,851 A | * | 8/1998 | Frank et al. | ............ 718/104 |
| 5,805,790 A | | 9/1998 | Nota et al. | |
| 5,815,651 A | * | 9/1998 | Litt | ............ 714/10 |
| 5,966,543 A | | 10/1999 | Hartner et al. | |
| 6,003,066 A | | 12/1999 | Ryan et al. | |
| 6,625,635 B1 | | 9/2003 | Elnozahy | |
| 6,625,751 B1 | | 9/2003 | Starovic et al. | |
| 6,769,073 B1 | | 7/2004 | Shapiro | |
| 6,772,367 B1 | | 8/2004 | Tarafdar et al. | |
| 6,792,497 B1 | * | 9/2004 | Gold et al. | ............ 710/317 |

(Continued)

FOREIGN PATENT DOCUMENTS
WO    2006077261 A2    7/2006

OTHER PUBLICATIONS

U.S. Patent Application entitled "Monitoring Patterns of Processes Accessing Addresses in a Storage Device to Determine Access Parameters to Apply", U.S. Appl. No. 11/868,469, filing date Oct. 5, 2007, by inventors P. Sarkar and D.K. Subhraveti.

(Continued)

*Primary Examiner* — Reginald Bragdon
*Assistant Examiner* — Gurtej Bansal
(74) *Attorney, Agent, or Firm* — David W. Victor; Konrad Raynes and Victor LLP

(57) ABSTRACT

Provided are a method, system, and article of manufacture for varying access parameters for processes to access memory addresses in response to detecting a condition related to a pattern of processes access to memory addresses. A monitored condition is detected during application execution. An instrumentation program is invoked to monitor processes accessing data at addresses in a memory device in response to detecting the monitored condition. Information is logged on processes and the addresses they access in the memory device in response to invoking the instrumentation program. The logged information on the processes and the addresses they access is forwarded to an application analysis system in response to detecting a monitored condition during application execution.

11 Claims, 4 Drawing Sheets

U.S. PATENT DOCUMENTS

| | | | |
|---|---|---|---|
| 6,832,367 | B1 | 12/2004 | Choi et al. |
| 6,851,075 | B2 | 2/2005 | Ur et al. |
| 6,886,162 | B1 * | 4/2005 | McKenney .................. 718/102 |
| 6,920,634 | B1 | 7/2005 | Tudor |
| 6,961,865 | B1 | 11/2005 | Ganesh et al. |
| 7,062,583 | B2 | 6/2006 | Kolinummi et al. |
| 7,185,236 | B1 | 2/2007 | Moser et al. |
| 7,206,964 | B2 | 4/2007 | Moser et al. |
| 7,240,057 | B2 | 7/2007 | Kingsbury et al. |
| 7,290,105 | B1 * | 10/2007 | Jeter et al. ..................... 711/163 |
| 2002/0013802 | A1 | 1/2002 | Mori et al. |
| 2002/0083149 | A1 | 6/2002 | Van Huben et al. |
| 2004/0177130 | A1 | 9/2004 | Chambliss et al. |
| 2004/0236990 | A1 | 11/2004 | Pavlik et al. |
| 2005/0071760 | A1 | 3/2005 | Jaeger |
| 2005/0149634 | A1 | 7/2005 | McKenney |
| 2005/0177821 | A1 | 8/2005 | Ogata et al. |
| 2005/0251794 | A1 | 11/2005 | Taylor et al. |
| 2005/0262411 | A1 | 11/2005 | Vertes et al. |
| 2006/0085784 | A1 | 4/2006 | Traut et al. |
| 2006/0136640 | A1 | 6/2006 | Tuan |
| 2006/0143512 | A1 | 6/2006 | Jia et al. |
| 2006/0184935 | A1 | 8/2006 | Abels et al. |
| 2008/0209422 | A1 * | 8/2008 | Coha ............................ 718/102 |
| 2009/0119549 | A1 | 5/2009 | Vertes |

OTHER PUBLICATIONS

U.S. Patent Application entitled "Recovery of Application Faults in a Mirrored Application Environment", U.S. Appl. No. 11/868,455, filing date Oct. 5, 2007, by inventors R.E. Harper and D.K. Subhraveti.

U.S. Patent Application entitled "Providing a Process Exclusive Access to a Page Including a Memory Address to Which a Lock is Granted to the Process", U.S. Appl. No. 11/868,447, filing date Oct. 5, 2007, by inventors P. Bergheaud, D.K. Subhraveti and M.P. Vertes.

Bergheaud, et al., "Fault Tolerance in Multiprocessor Systems Via Application Cloning", 27th International Conference on Distributed Computing Systems, 2007, pp. 1-10.

Christiaens, et al., "Record/Replay in the Presence of Benign Data Races", 2002, pp. 1-7.

Daniel, et al., "Transparent Process Replication", 2000, pp. 1-6.

Dunlap, et al., "ReVirt: Enabling Intrusion Analysis Through Virtual-Machine Logging and Replay", Proceedings of the 2002 Symposium on Operating Systems Design and Implementation (OSDI), 2002, pp. 1-14.

He, et al., "Preemption Adaptivity in Time-Published Queue-Based Spin Locks", Dept. of Computer Science University of Rochester, NY, 2005, pp. 1-12.

Huangs, et al., "Handling Catastrophic Failures in Scalable Internet Applications", IEEE, 2004, pp. 1-7.

Krammer et al., "MARMOT: An MPI Analysis and Checking Tool", High Performance Computer Center Stuttgart, Germany, 2004, pp. 1-6.

Kranzmuller, "Event Graph Analysis for Debugging Massively Parallel Programs", Dept. for Graphics and Parallel Processing Joh. Kepler University Linz, Austria, Sep. 2000, pp. 1-344.

Lim, "Reactive Synchronization Algorithms for Multiprocessors", Massachusetts Institute of Technology, 1995, pp. 1-162.

Marathe, et al., "Composite Abortable Locks", IEEE, 2006, pp. 1-10.

Mellor-Crummey, et al., "A Software Instruction Counter", ACM, 1989, pp. 78-86.

Osman et al., "The Design and Implementation of Zap: A System for Migrating Computing Environments", Proceedings of the 5th Symposium on Operating Systems Design and Implementation (OSDI 2002), Dec. 2002, pp. 1-16.

Russinovich, et al., "Operating System Support for Replay of Concurrent Non-Deterministic Shared Memory Applications", Dept. of Computer Science University of Oregon, 1996, pp. 1-5.

Slye, et al., "Support for Software Interrupts in Log-Based Rollback-Recovery", 26th Symposium on Fault-Tolerant Computer Systems, Jun. 1996, pp. 1-20.

Final Office Action for U.S. Appl. No. 11/868,465, dated Jun. 17, 2010, 19 pgs.

* cited by examiner

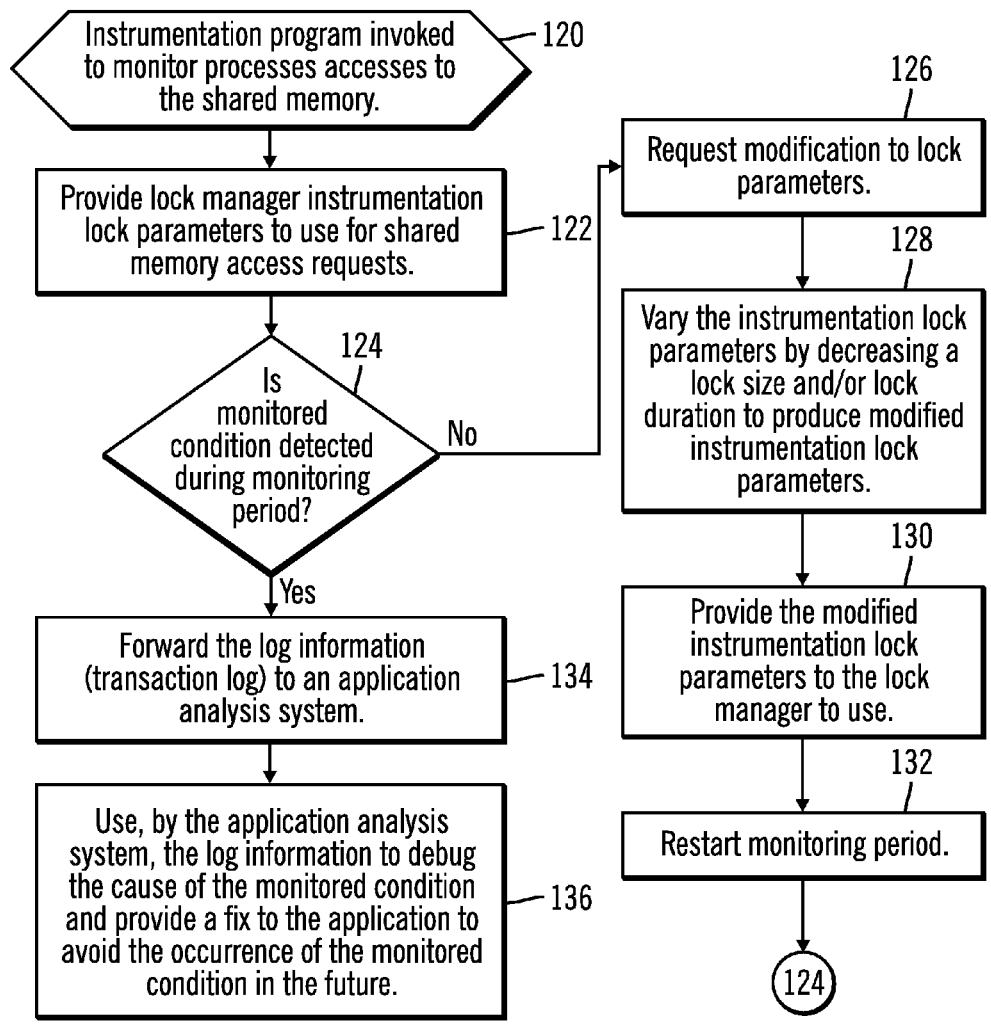

VARYING ACCESS PARAMETERS FOR PROCESSES TO ACCESS MEMORY ADDRESSES IN RESPONSE TO DETECTING A CONDITION RELATED TO A PATTERN OF PROCESSES ACCESS TO MEMORY ADDRESSES

BACKGROUND OF THE INVENTION

1. Field of the Invention

The present invention relates to a method, system, and article of manufacture for varying access parameters for processes to access memory addresses in response to detecting a condition related to a pattern of processes access to memory addresses.

2. Description of the Related Art

Application processes may concurrently access memory addresses in a shared memory. A process may comprise one or more threads allocated processor and computer resources to execute computer instructions. Multiple processes or multiple threads in one process may concurrently execute instructions for one application, or multiple processes may concurrently execute instructions for multiple applications. Multiple processes may execute on multiple processors. The term "process" as used herein refers to a process, thread or any other unit of execution allocated to execute instructions. To access the memory addresses, the processes must obtain a spinlock for each address. If the spinlock is not available or granted to another process, then the process must repeatedly check until the spinlock becomes available. Application processes may experience an execution error based on a non-deterministic pattern of accesses. For instance, a certain non-deterministic access pattern of requests for memory addresses may result in a deadlock or other locking errors due to a race condition. A race condition occurs when separate processes or threads of execution depend on some shared state. A deadlock refers to a specific condition when two or more processes, such as in a multi-processor environment, are each waiting for the process to release a shared resource, such as a lock for a resource, or more than two processes are waiting for resources in a circular chain.

Troubleshooting of errors resulting from non-deterministic access patterns of the shared resource may be difficult to predict or replicate because many access patterns for the same set of processes may not produce an error. Thus, even if the developer is alerted of the problem, the developer may not be able to reproduce the access pattern or conditions that lead to the error. Further, during product development, the developer may not be able to take into account all access patterns that may occur when testing concurrent processes on multiple processors, and may not experience the error because the problem access pattern was not realized during testing conditions.

There is a need in the art for improved techniques for monitoring for errors resulting from non-deterministic access patterns of computer resources, such as memory addresses in a shared memory.

SUMMARY

Provided are a method, system, and article of manufacture for varying access parameters for processes to access memory addresses in response to detecting a condition related to a pattern of processes access to memory addresses. A monitored condition is detected during application execution. An instrumentation program is invoked to monitor processes accessing data at addresses in a memory device in response to detecting the monitored condition. Information is logged on processes and the addresses they access in the memory device in response to invoking the instrumentation program. The logged information on the processes and the addresses they access is forwarded to an application analysis system in response to detecting a monitored condition during application execution.

BRIEF DESCRIPTION OF THE DRAWINGS

FIG. 5 illustrates an embodiment of operations performed by an operating system to invoke an instrumentation program.

FIG. 6 illustrates an embodiment of operations to monitor process accesses to memory for a monitored condition.

DETAILED DESCRIPTION

Figure 1:
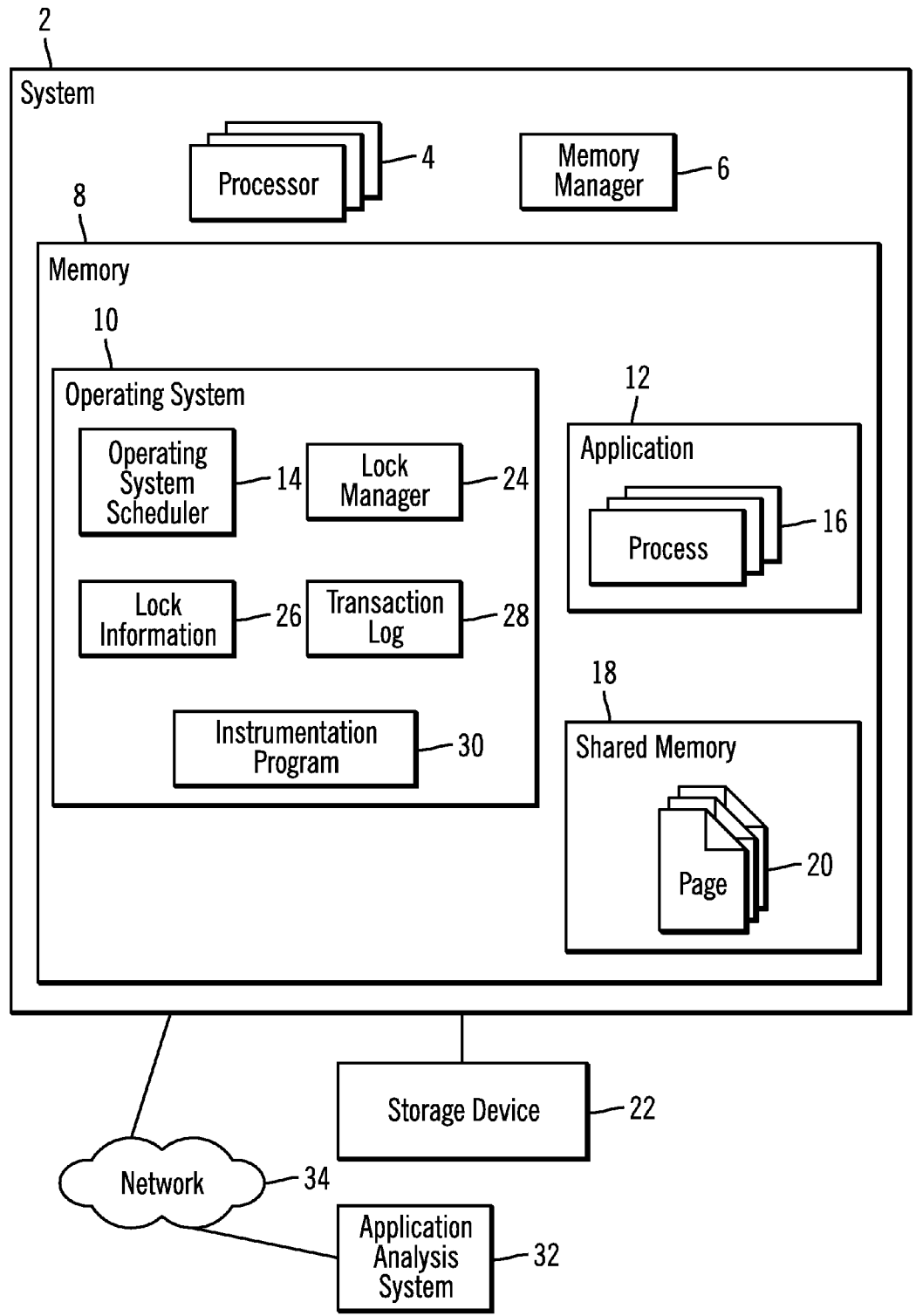
FIG. 1 illustrates an embodiment of a computing environment.

FIG. 1 illustrates an embodiment of a computing environment. A system 2 includes multiple processors 4 and a memory manager 6 managing access to a memory 8. The processor 4 loads into the memory 8 an operating system 10 providing a runtime environment for one or more applications 12. An operating system scheduler 14 may spawn processes 16 that perform the application 12 operations. The processes 16 may comprise processes, threads, etc. The processes 16 may be executed by one or more of the processors 4 and may concurrently access a shared memory 18. The shared memory 18 includes pages 20. The memory manager 6 may map received virtual addresses used by the operating system 10 and processes 16 to addresses in one of the pages 20. The data in the pages 20 may include data used by application processes 16 and data from a storage 22 coupled to the system 2. Pages 20 may be stored in the shared memory 18 or swapped to the storage 22 if there is not sufficient space for all the pages 20 in the memory.

If a process 16 references a memory address that resolves within a page 20 that is not available in the shared memory 18, then the memory manager 6 generates a page fault to the operating system 10 to cause the operating system 10 to load the required page 20 from a paging file in the storage 22.

If a process 16 requires access to a memory address in a page 20 to write to the page 20, then the operating system 10 would invoke a lock manager 24 to determine if the memory address is available for an exclusive lock. The lock manager 24 checks lock information 26 to determine whether to grant a lock for the process 16 requesting access to the memory address. If the lock is granted, then the process 16 may write to the memory address. The lock manager 24 maintains a transaction log 28 in which the lock manager 24 logs an entry for each process 16 obtaining a lock to access a memory address.

In one embodiment, the lock manager 24 operations may be performed outside of the kernel space of the operating system 10 and execute within the application space without intervention from the operating system 10 or hardware. For instance, if the lock manager 24 is granting spinlocks to process requests 16, then the lock manager 24 operations and spinlocks may be maintained within the user application space. Upon receiving a spinlock for a memory address in the shared memory 18, the requesting process 16 receiving the spinlock would access the resource covered by the spinlock. If another process 16 tries to access the resource covered by a granted spinlock, then that process 16 will retry the request after a predefined period until the spinlock is acquired. In alternative embodiments, the lock manager 24 may operate within the operating system 24 kernel space and grant lock types other than spinlocks.

An instrumentation program 30 may be invoked if the operating system 10 detects a monitored condition, such as an undesirable outcome, execution error, bug, fatal error or other predefined condition, occurring during the execution of processes 16 to observe operating conditions as part of monitoring for a recurrence of the monitored condition. In response to being invoked, the instrumentation program 30 may invoke the lock manager 24 to maintain the transaction log 28 or otherwise log processes. Upon detecting a reoccurrence of the previously detected monitored condition and/or a new monitored condition, the instrumentation program 30 may forward the transaction log 28 to an application analysis system 32. The application analysis system 32 may debug the cause of the detected monitored condition using the transaction log 28 to allow identification of the source of the monitored condition.

In one embodiment, the application 12 producing the monitored condition may be installed and running at a customer site and the application analysis system 32 may comprise a computer maintained by the application 12 developer. The instrumentation program 30 may be supplied by the developer to generate a transaction log 28 if an application 12 monitored condition is detected and then forward the transaction log 28 to the application analysis system 32 over a network 34. The developer using the application analysis system 32 may use the received transaction log 28 to debug the monitored error to determine the source of the monitored condition and then create a fix or update to the application 12 to distribute to customers that will prevent the noted monitored condition from reoccurring. In an alternative embodiment, the system and application analysis system 32 may be maintained by the application 12 developer, where the application developer 12 may run the application 12 in the system 2 to test the application 12.

In one embodiment, the transaction log 28 may log additional application 12 execution information to allow the application analysis system 32 to reproduce, e.g., replay, the operations of the application 12 that resulted in the transaction log 28 entries to reproduce the detected monitored condition.

Figure 2:
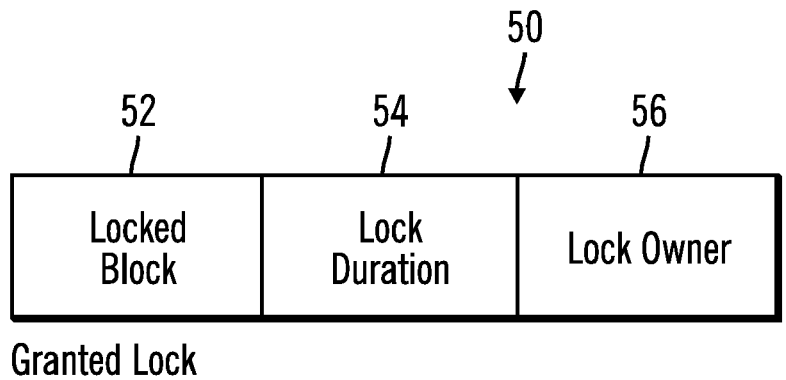
FIG. 2 illustrates an embodiment of a granted lock.

FIG. 2 illustrates an embodiment of a granted lock 50 maintained in the lock information 26. The granted lock 50 indicates: a locked block 52, e.g., one memory address, a block of memory addresses, one or more pages 20 of memory addresses, etc, that is covered by the lock 50; a lock duration 54 indicating a duration during which the requesting process 16 holds the lock 50, which may comprise a period of time, e.g., number of clock cycles, process time slice, a number of executed instructions that the process holding the lock must perform with respect to the one or more addresses in the locked block 52 before the lock is released, etc.; and a lock owner 56 indicating the process 16 holding the lock 50 covering the requested memory address.

Figure 3:
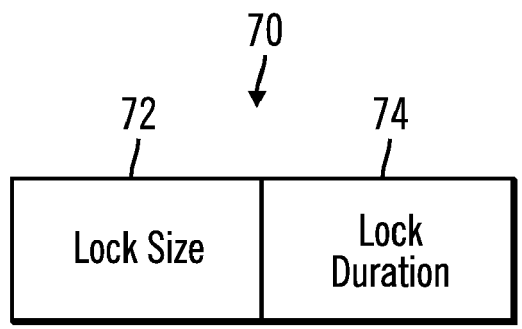
FIG. 3 illustrates an embodiment of instrumentation lock parameters.

FIG. 3 illustrates an embodiment of instrumentation lock parameters 70 maintained by the instrumentation program 30. When running, the instrumentation program 30 may provide the lock manager 24 the instrumentation lock parameters 70 for the lock manager 32 to use to determine the scope of the granted lock, such as a lock size 72 and/or lock duration 74. The lock size 72 indicates a number of memory addresses including the requested memory address (or requested addresses) covered by the lock, which may specify to lock only the requested one or more addresses, a block of addresses including the requested address or one or more pages of addresses including the requested address. The lock duration 74 indicates the duration during which the lock is held, e.g., clock cycles, executed instructions, etc.

Figure 4:
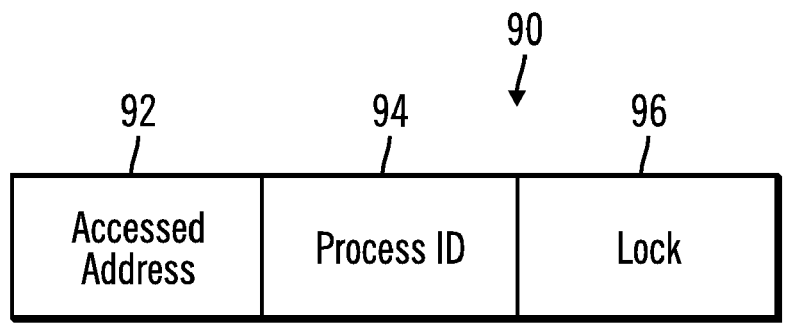
FIG. 4 illustrates an embodiment of a transaction log entry.

FIG. 4 illustrates an embodiment of an en entry 90 in the transaction log 28 for each process 16 access to a memory address indicating an accessed memory address 92, a process ID 94 of the process that accessed the memory address 92, and a lock 96 obtained for the access. The log 28 may maintain a list of transaction entries 90 in the order in which the processes 16 accessed the shared memory 18. The transaction log 28 may provide additional information on the application 12 execution of processes 16 to enable the application analysis system 32 to replay the operations of the application 12 recorded in the transaction log 28.

Described embodiments provide for a technique performed by a component of the operating system 10, such as the lock manager 24 or instrumentation program 32, to monitor patterns of address access requests to determine if a non-deterministic pattern of access requests results in the reoccurrence of a previously detected monitored condition, such as an undesirable outcome, execution error, deadlock, bug, etc. For instance, a deadlock may occur in a situation where a page 20 includes three spinlocks S1, S2, and S3 for three different memory addresses. If three processes P1, P2, and P3 acquire spinlocks S1, S2, and S3, respectively, and then P1, P2, and P3 wait to obtain spinlocks S2, S3, and S1, respectively, then P1, P2, and P3 will not release their currently held locks until the new lock is obtained. This results in a deadlock, because P1 will not release S1 until S2 is released by P2, which will not occur unless P3 releases S3, which P2 requires next.

In the described embodiments, upon an access pattern resulting in the monitored condition occurring, the instrumentation program 30 may begin monitoring and logging processes access to memory addresses in order to provide the logged information 28 for analysis if the reoccurrence of this monitored condition is detected. The logged information 28 may be used by a developer to determine the source of the problem and generate a fix or update to the application 12 in which the monitored condition occurred.

FIG. 5 illustrates an embodiment of operations performed by the operating system 10 upon detecting an application 12 monitored condition. Upon detecting (at block 100) a monitored condition during application 12 execution, the operating system 10 invokes (at bock 102) the instrumentation program 30 to monitor the execution of the application 12 for a reoccurrence of the detected monitored condition and/or a new monitored condition.

FIG. 6 illustrates an embodiment of operations performed by the instrumentation program 30 upon being invoked by the operating system 10. Upon being invoked (at block 120), the instrumentation program 30 monitors process 16 accesses to the shared memory 18. The instrumentation program 30 provides (at block 122) the lock manager 24 instrumentation lock parameters 70 to use for shared memory 18 access lock requests. If (at block 124) a monitored condition is not detected during a monitoring period, which may be specified in the instrumentation program 30 settings, then the instrumentation program 30 requests (at block 126) a modification to the lock parameters 70. The instrumentation lock parameters 70 may be modified automatically by the instrumentation program 30 or user input may be received specifying a modification to the instrumentation lock parameters 70. The instrumentation lock parameters 70 may be varied (at block 128) by decreasing the lock size 72 and/or the lock duration 74 to produce modified instrumentation lock parameters. If the lock parameters 70 include different or additional parameters, then the modifications may apply to such different or additional lock parameters. The instrumentation program 30 provides (at block 130) the modified instrumentation lock parameters 70 to the lock manager 24 to use to grant locks according to the modified lock parameters. The instrumentation program 30 restarts (at block 132) the monitoring period and returns to block 124 to monitor for predefined monitored conditions, e.g., errors or undesirable outcomes.

If the instrumentation lock parameters 70 specify a lock size 72 of multiple addresses and a lock duration 74 exceeding the time to execute the single instruction against the requested address, then the instrumentation program 30 operations may modify process operations in a manner that prevents the monitored condition from reoccurring, especially if the monitored condition is non-deterministic. Thus, by reducing the lock size 72 and lock duration 74, the instrumentation program 30 moves closer to implementing lock parameters closer to how the lock manager 24 operates without instrumentation lock parameters, using default lock manager 24 lock parameters, which may provide an address level lock for a single instruction duration. Alternatively, the lock manager 24 default parameters may have a lock size covering multiple addresses and a lock duration extending beyond a single instruction. In certain embodiments, the instrumentation program 30 may begin operating with a lock size 72 and duration 74 greater than that used by the lock manager 24 under default lock parameter settings to reduce the frequency of transaction logging and the size of the log 28. However, if the previously detected monitored condition does not reoccur, then the lock duration 74 and size 72 will be reduced to closer approximate lock manager 24 operations without instrumentation program 30 monitoring.

If (at block 124) a monitored condition is detected while the instrumentation program 30 is running before the monitoring period has expired, then the instrumentation program 30, operating automatically or under user control, forwards (at block 134) the transaction log 28 to the application analysis system 32. The application analysis system 32 may use (at block 136) the transaction log 28 to debug the cause of the monitored condition and provide a fix or update to the application 12 to prevent the occurrence of the monitored condition in the future.

Figure 7:
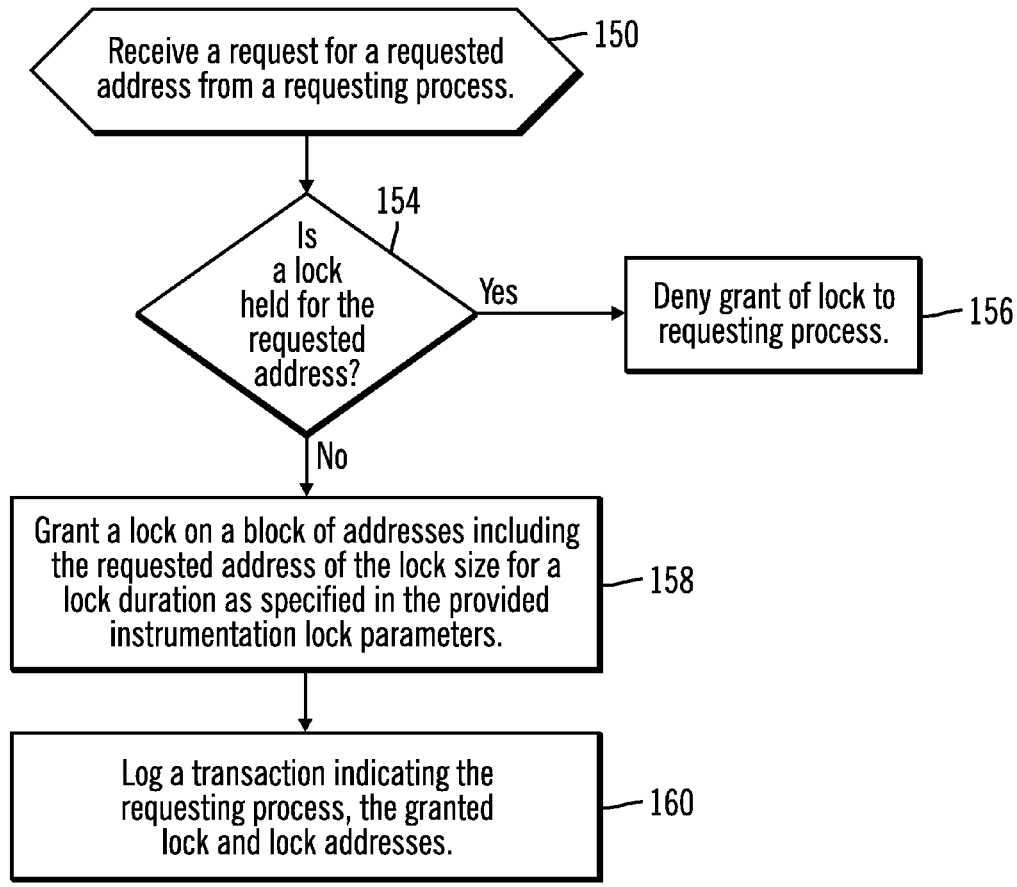
FIG. 7 illustrates an embodiment of operations to grant a lock to a process.

FIG. 7 illustrates an embodiment of operations performed by the lock manager 24 (or some other components of the operating system 10) to process a request for exclusive access to an address in the shared memory 18. Upon receiving (at block 150) a request for a requested address from a requesting process 16, the lock manager 24 determines (at block 152) whether a lock is held covering the requested address. If so, then the lock is denied (at block 156). If (at block 152) the lock information 28 does not indicate a lock held against the requested address, then the lock manager 24 grants (at block 158) a lock on the locked block 52, comprising the block of addresses including the requested address of the lock size 72, for a lock duration 74 as specified in the provided instrumentation lock parameters 70 (FIG. 3). The lock manager 24 may log (at block 160) a transaction 90 comprising the requesting process 94, the granted lock 96 and the requested addresses 92. The lock manager 24 may only log such access information while the instrumentation program 30 is invoked and running. Further, if the instrumentation program 30 is not running, then the lock manager 24 may use default lock parameters and not use instrumentation lock parameters 70 supplied by the instrumentation program 30.

Figure 8:
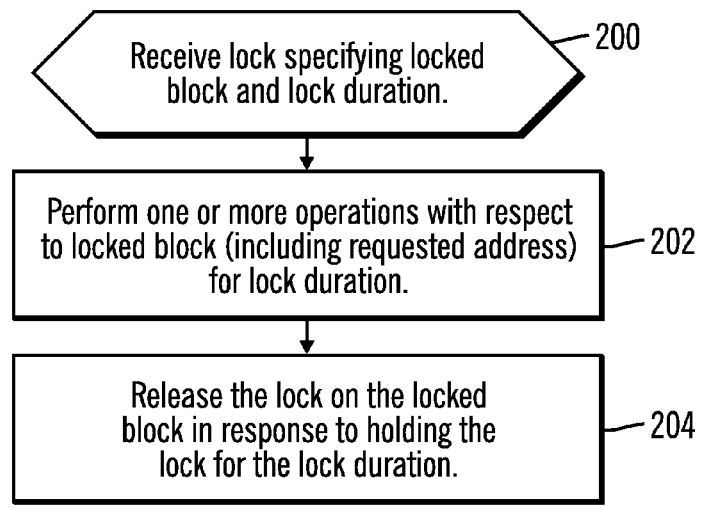
FIG. 8 illustrates an embodiment of operations for a process to perform with respect to a memory address and release a lock obtained for a memory address.

FIG. 8 illustrates an embodiment of operations performed by processes 16 receiving a lock 50 (FIG. 2). Upon receiving (at block 200) the granted lock 50 having the indicated locked block 52 and lock duration 54, then the process 16 performs (at block 202) the operations with respect to the addresses covered by the locked block 52 requested address. The lock is released (at block 204) upon holding the lock for the lock duration 54 specified in the grant 50

Described embodiments provide techniques to monitor and record processes access to memory in the event of a monitored condition resulting from process execution. Upon detecting a reoccurrence of the previously detected monitored condition or new monitored condition, an instrumentation program 30 may supply the transaction log 28 recorded since the monitored condition was detected to allow a developer or other entity to create an application 12 fix or upgrade. Thus, described embodiments provide techniques for monitoring for monitored conditions.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the access parameters are changed for process accesses to memory addresses in a shared memory. In an alternative embodiment, access patterns may be monitored for computer resources other than memory addresses, such as addresses in a storage device and other computer resources.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

FIGS. 2, 3, and 4 provide an embodiment of lock information. In alternative embodiments, the lock information shown in FIGS. 2, 3, and 4 may be arranged in alternative manners and include additional information.

The illustrated operations of FIGS. 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable medium implementing code or logic executed to perform operations related to processes accessing addresses in a memory device, the operations comprising:

detecting a monitored condition during application execution;

invoking an instrumentation program to monitor processes accessing data at addresses in the memory device in response to detecting the monitored condition, wherein the instrumentation program is invoked with instrumentation lock parameters indicating lock parameters to use for granting locks;

receiving a request from a requesting process for a requested address in the memory device following the invocation of the instrumentation program;

granting a lock to the requesting process according to the lock parameters indicated in the instrumentation lock parameters to permit the requesting process to access the requested address, wherein subsequent processes cannot access addresses covered by the lock granted to the requesting process until the requesting process releases the lock;

varying the instrumentation lock parameters to produce modified instrumentation lock parameters in response to not detecting the reoccurrence of the monitored condition within a predetermined time following invocation of the instrumentation program, wherein locks granted following the varying of the instrumentation lock parameters use the varied instrumentation lock parameters;

logging information on the processes and the addresses they access in the memory device in response to invoking the instrumentation program; and forwarding the logged information on the processes and the addresses they access to an application analysis system in response to detecting a reoccurrence of the monitored condition during the application execution following the invocation of the instrumentation program.

2. The article of manufacture of claim 1, wherein the lock parameters indicate a lock duration during which the requesting process holds the lock and a lock size indicating a number of memory addresses including the requested address covered by the lock during the lock duration.

3. The article of manufacture of claim 1, wherein the instrumentation lock parameters indicate a lock duration during which the requesting process holds the lock and a lock size indicating a number of memory addresses including the requested address covered by the lock during the lock duration, and wherein varying the instrumentation lock parameters comprises modifying at least one of the lock duration and the lock size.

4. The article of manufacture of claim 3, wherein the lock duration is varied from one instruction to multiple instructions and the lock size is varied from the requested address to a block of multiple addresses.

5. The article of manufacture of claim 3, wherein the varying of the instrumentation lock parameters comprises decreasing at least one of the lock duration and the lock size.

6. A system in communication with an application analysis system, comprising:
    at least one processor;
    at least one computer readable medium accessible to the processor, including:
        an application wherein the at least one processor implements a plurality of processes to execute the application;
        an instrumentation program;
        an operating system executed by the at least one processor to perform operations, the operations comprising:
            detecting a monitored condition during the application execution;
            invoking the instrumentation program to monitor processes accessing data at addresses in the at least one computer readable medium in response to detecting the monitored condition, wherein the instrumentation program is invoked with instrumentation lock parameters indicating lock parameters to use for granting locks;
        a lock manager executed by at least one of the processors for performing operations, the operations comprising:
            receiving a request from a requesting process for a requested address in the at least one computer readable medium following the invocation of the instrumentation program;
            granting a lock to the requesting process according to the lock parameters indicated in the instrumentation lock parameters to permit the requesting process to access the requested address, wherein subsequent processes cannot access addresses covered by the lock granted to the requesting process until the requesting process releases the lock;
        wherein the instrumentation program is executed by the at least one processor to perform operations, the operations comprising:
            logging information on the processes and the addresses they access in the at least one computer readable medium in response to invoking the instrumentation program;
            forwarding the logged information on the processes and the addresses they access to the application analysis system in response to detecting a reoccurrence of the monitored condition during the application execution following the invocation of the instrumentation program; and
            varying the instrumentation lock parameters to produce modified instrumentation lock parameters in response to not detecting the reoccurrence of the monitored condition within a predetermined time following invocation of the instrumentation program, wherein locks granted following the varying of the instrumentation lock parameters use the varied instrumentation lock parameters.

7. The system of claim 6, wherein the instrumentation lock parameters indicate a lock duration during which the requesting process holds the lock and a lock size indicating a number of memory addresses including the requested address covered by the lock during the lock duration, and wherein varying the instrumentation lock parameters comprises modifying at least one of the lock duration and the lock size.

8. The system of claim 7 wherein the lock duration is varied from one instruction to multiple instructions and the lock size is varied from the requested address to a block of multiple addresses.

9. A computer implemented method, comprising:
    detecting a monitored condition during application execution in a computer system;
    invoking an instrumentation program to monitor processes accessing data at addresses in a memory device in response to detecting the monitored condition, wherein the instrumentation program is invoked with instrumentation lock parameters indicating lock parameters to use for granting locks;
    receiving a request from a requesting process for a requested address in the memory device following the invocation of the instrumentation program;
    granting a lock to the requesting process according to the lock parameters indicated in the instrumentation lock parameters to permit the requesting process to access the requested address, wherein subsequent processes cannot access addresses covered by the lock granted to the requesting process until the requesting process releases the lock;
    logging information on the processes and the addresses they access in the memory device in response to invoking the instrumentation program;
    forwarding the logged information on the processes and the addresses they access to an application analysis system in response to detecting a reoccurrence of the monitored condition during the application execution following the invocation of the instrumentation program; and
    varying the instrumentation lock parameters to produce modified instrumentation lock parameters in response to not detecting the reoccurrence of the monitored condition within a predetermined time following invocation of the instrumentation program, wherein locks granted following the varying of the instrumentation lock parameters use the varied instrumentation lock parameters.

10. The method of claim 9, wherein the instrumentation lock parameters indicate a lock duration during which the requesting process holds the lock and a lock size indicating a number of memory addresses including the requested address covered by the lock during the lock duration, and wherein varying the instrumentation lock parameters comprises modifying at least one of the lock duration and the lock size.

11. The method of claim 10, wherein the lock duration is varied from one instruction to multiple instructions and the lock size is varied from the requested address to a block of multiple addresses.

* * * * *